United States Patent
Gassoway

(10) Patent No.: US 8,230,509 B2
(45) Date of Patent: Jul. 24, 2012

(54) SYSTEM AND METHOD FOR USING RULES TO PROTECT AGAINST MALWARE

(75) Inventor: Paul Alan Gassoway, Norwood, MA (US)

(73) Assignee: CA, Inc., Islandia, NY (US)

( * ) Notice: Subject to any disclaimer, the term of this patent is extended or adjusted under 35 U.S.C. 154(b) by 1311 days.

(21) Appl. No.: 11/520,656

(22) Filed: Sep. 14, 2006

(65) Prior Publication Data
US 2008/0127334 A1    May 29, 2008

(51) Int. Cl.
*G06F 11/00* (2006.01)
(52) U.S. Cl. ............. 726/24; 726/22; 713/188; 713/193
(58) Field of Classification Search ....................... 726/24
See application file for complete search history.

(56) References Cited

U.S. PATENT DOCUMENTS

| | | | | |
|---|---|---|---|---|
| 5,960,170 A | * | 9/1999 | Chen et al. | 714/38 |
| 6,338,141 B1 | * | 1/2002 | Wells | 726/24 |
| 2004/0073811 A1 | * | 4/2004 | Sanin | 713/201 |
| 2006/0041942 A1 | * | 2/2006 | Edwards | 726/26 |

* cited by examiner

*Primary Examiner* — Thanhnga B Truong
*Assistant Examiner* — Mohammad L. Rahman
(74) *Attorney, Agent, or Firm* — Pillsbury Winthrop Shaw Pittman LLP

(57) ABSTRACT

The invention provides a method of disabling malicious or unwanted software on a computer system using a plurality of rules, wherein the plurality of rules automatically disable functions originating from malicious software. In one embodiment, the method includes detecting a function that is attempting to act on an object within the computer system and identifying one or more rules from the plurality of rules that apply to the object. The function may then be automatically disabled when the identified rules indicate that the function should be disabled.

19 Claims, 5 Drawing Sheets

SYSTEM AND METHOD FOR USING RULES TO PROTECT AGAINST MALWARE

FIELD OF THE INVENTION

The invention relates to a system and method for using rules to protect a computer system against malicious software specifically designed to target certain programs or program extensions to infiltrate or otherwise adversely affect a computer system's operability. This type of software has come to be called malware.

BACKGROUND OF THE INVENTION

Early anti-virus products were designed to detect any event that may be considered suspicious activity such as, for example, an attempt to update an executable file. This purported suspicious activity would typically result in an alert to the user. The user could then choose to disable the activity or allow it to proceed. While some of the purported suspicious activity was the result of malicious or harmful software, some of this purported suspicious activity was actually benign activity. As such, users of these types of anti-virus products, possibly due to confusion, would often allow all activity presented in these alerts to occur.

This early type of anti-virus software was advantageous in that it enabled protection from unknown viruses. This was because it guarded against the potentially harmful activity that any virus might attempt to perform and did not need to recognize and eliminate the virus itself. However, because of the above mentioned confusion among users, this early type of anti-virus software was replaced by signature-based software that operated by recognizing and eliminating the viral code itself. The drawback to signature-based anti-virus software is that it may not recognize and eliminate new or unrecognized threats. Because new computer virus and malware threats emerge on an almost daily basis, many threats are not immediately detected and disabled by signature-based software.

As such, there exists a need for improved protection against these threats by focusing preventative efforts on the harmful actions of viruses and malware, rather than simply attempting to recognize and eliminate their code. These and other problems exist.

SUMMARY OF THE INVENTION

The invention solving these and other problems in the art relates to a system and method for utilizing rules to protect against malware. As used herein, malware includes any malicious hardware, software, or firmware that is intended to cause harm to a computer system or its users such as, for example, computer viruses, worms, Trojan horses, spyware, root kits, or other items. Malware may also include hardware, software, or firmware that unintentionally causes harm to a computer system or it's users. Malware may cause harm by damaging computer hardware or software, by altering or erasing information, gathering sensitive user information, or by performing other acts. The invention protects a computer system (e.g., one or more servers, PCs, networks, and/or other computer equipment) by focusing protective efforts on the functions and actions that malware attempts to perform in or on a target computer system, while utilizing rules to automatically determine which functions are permitted to act on certain objects within the computer system. The use of rules to determine which functions are permitted eliminates the need for user decisions, some of which may be erroneous, to protect against the harmful effects of malware.

As used herein, the term "function" refers to one or more actions performed towards a specified goal. Functions may be coded by, initiated by, or otherwise provided by an application, module, or other piece of software or firmware. As used herein, the term "process" is used in the operating system (OS) meaning of the word, which is a set of resources, such as a memory, threads, or other OS resources exclusively owned by that set. As used herein, a process always has the name of the binary used to create the process, such as, misiexec.exe.

In one embodiment, the invention may be utilized to protect a computer system. As used herein, a computer system may include one or more computers such as, for example, desktop computers, laptop computers, servers, personal digital assistants (PDAs), cell phones, pagers, and/or other devices. A computer system may also include one or more virtual or actual networks, network devices, data storage devices, and/or other elements. While the invention may be used to protect a computer system, the system of the invention may include some or all of the elements of the computer system it is used to protect and may include additional elements.

In one embodiment, the invention may include a plurality of predetermined rules. Each of the rules in the plurality of rules may indicate that a function of a certain type may not be performed on a specific object within a computer system. For example, in one embodiment, there may be two types of rules that prevent two main types of functions: update rules, which prevent the update of specific objects within the computer system, and deletion rules, which prevent the deletion of specific objects within the computer system. Other rules preventing other types of functions may exist within the scope of the invention.

In one embodiment, each rule from the plurality of rules may comprise one or more parts that dictate the functional characteristics of the rule. For example, in one embodiment, rules of any type may have five parts such as, for example, a platform value, a component value; a path; a process list; and an exception list. Rules having more or fewer parts may also be used in the invention. As stated above, rules may also be identified as having a function type that identifies the type of functions the rule prevents.

A rule's platform value may identify the platform to which the rule applies. A platform may include the specific element or type of element of the computer system that the rule applies to or may indicate the specific operating system to which the rule applies. By specifying a platform value for each rule, a single rule set (e.g., the plurality of rules) may be utilized for multiple platforms without burdening elements of the computer system with rules that only apply to other elements or operating systems.

A rule's component value specifies the type of object upon which the rule is to operate. For example, in one embodiment, a component value of a rule may specify whether a rule applies to a file object within a computer system or a registry object within the computer system. A file object may include a directory or file within a computer system. A registry object may include a registry key or a registry value within a computer system. Other types of objects may be specified by the component value of a rule.

A rule's path may include a regular expression that defines the specific object (e.g., directory, file, registry key, registry value, or other object) that the rule applies to.

In one embodiment, the process list of a rule may include a specified list of processes to which a rule does not apply. If the process list of a rule is blank, the rule acts to prevent all processes from violating the rule.

It may be desirable to exclude certain processes from being blocked or prevented by a rule. These processes may be recognized as part of the normal operations of computer system and thus it may not be desirable to block them. As such, these desirable processes may be identified on the process list. For example, in an update rule, install.exe, msiexec.exe, wupdmgr.exe or other processes may be put on the process list so that the rule does not apply to them, as these types of install programs are likely to perform legitimate operations.

The exception list of a rule may specify a list of exceptions that apply to the rule. In some embodiments, an exception operates to allow a function when the rule would otherwise prevent it. In other embodiments, an exception may operate to prevent a function when it is otherwise affirmatively allowed by a rule. Exceptions may be structured exactly the same as rules and thus, may be considered rules themselves. That is, an exception may have a platform value, a component value, a path, a process list, and its own exception list. An exception may be invoked when it is found on the exception list of a rule. For the exception to be successfully invoked, is must be of the same rule type (e.g., update or delete) as the rule to which it applies and must have the same platform value and component value as the rule to which it applies.

Due to the complex rule/exception structure, the invention enables construction of layers of complexity that precisely identify what functions to prevent so that malicious operations of malware can be successfully blocked and so that normal operation of the computer system continues unfettered.

In one embodiment, the invention provides a method for protecting against malicious or harmful software by utilizing the plurality of rules when potentially malicious or harmful functions attempt to run or act on objects within the computer system. In one embodiment, a function that is attempting to run or act on an object within the computer system is detected and intercepted (e.g., it is not allowed to continue). The function may originate from a program, module, or other source from within the computer system or may come from outside of the computer system (such as via a network).

In one embodiment, the invention classifies the detected function that is attempting to act on an object within the system as either "acceptable," "unacceptable," or "suspicious." These classifications are exemplary only, other classifications may also exist. The plurality of rules associated with the system are used to apply these classifications to the detected function.

A detected function may be "acceptable" if an examination of the rules indicates that the function is not malicious, and thus allowed to act on its intended object within the system. This classification may result from several instances such as, for example, where no rule exists for the object on which the detected function is attempting to run, where a rule affirmatively allows the function to run, or in other circumstances.

A detected function may be "unacceptable" if an examination of the rules indicates that it is known, or that there is a very high likelihood, that the function is malicious or damaging. For example, if a rule in the plurality of rules exists that affirmatively prevents the detected function, the function may be deemed "unacceptable," and the function may not be allowed to run. However, a detected function may also be prevented from running if it is deemed "suspicious." That is, rules may exist that prevent a detected function from running, even though the knowledge of whether this function is malicious or damaging is not certain. In these instances, the suspicious function may be intercepted (not allowed to run), alerts may be sent to one or more users or administrators, and a decision may be made as to whether or not to allow the suspicious function to run. While this type of user-assisted detection of malware may suffer from problems previously identified with user interaction, a well developed and informed set of rules applied according to the invention prevents most, if not all, problematic outcomes.

Upon detection of a function that is attempting to act on an object within the computer system, the plurality of rules are searched to identify one or more rules that apply to the object on which the process is attempting to act. When identifying one or more rules from the plurality that apply to the object, the platform value of each rule may be checked to see if it matches the platform on which the object runs. The component values of the rules may also be checked to see if they specify an object type corresponding to the object. Finally, the paths of the rules may be checked to see if any point to the object on which the function is attempting to act.

In one embodiment, the function type of one or more identified rules (i.e., those that are applicable to the object) may be examined to see if they match the type of function attempting to act on the object (e.g., if the attempted function is an update function, are any of the identified rules update rules?). Alternatively, the plurality of rules may be examined for function types that match the attempted function prior to identifying whether one or more rules in the plurality of rules apply to the object.

If the function attempting to act on the object matches the function type of any of the identified rules that apply to the object, then, absent other circumstances, the function is not permitted to act on the object and it is disabled. However, the function may first be checked against the process lists of all of the identified rules to see if the function is allowed by any of the rules. If the process lists of the identified rules are empty, then all functions are affected by the rules.

The attempted function may then be checked against the identified rules to see if any exceptions apply that would allow an otherwise disabled function or disable an otherwise allowed function. If, after consulting the process lists and exception lists of the identified rules, the specific attempted function is allowed by any of the rules, it is allowed to act on the object. If all of the rules prevent the function, the function is automatically disabled.

In one embodiment, a log entry is created regarding the disabled function. In some embodiments, the log entry may include the identity of the function that was disabled, the origin of the function (e.g., program, application, module or other source) that was disabled, the identity of the one or more rules that disabled the function, the identity of the object (e.g., path/element information), a classification of the function as "unacceptable," "suspicious," or other classification, and/or other information. The log entry may be entered into the system event log of the device/element of the computer system where the object exists. In some embodiments, a log entry may also be entered into the general event log of the computer system. Other log entries may be created. In one embodiment, an error message may be sent to the application, program, module, or other source of the disabled function (e.g., the caller) indicating that the function was disabled.

As discussed above, log entries may include classifications of disabled functions as "unacceptable" or "suspicious." In some embodiments, entries classified as "suspicious" may be used to alert users, administrators, or others regarding the need for assessment of such "suspicious" functions.

In some embodiments, the invention may include a system for protecting a computer system from malicious or harmful software. In some embodiments, the system may include one or more software modules for performing the operations, features, and functions described herein.

These and other objects, features, and advantages of the invention will be apparent through the detailed description of the preferred embodiments and the drawings attached hereto. It is also to be understood that both the foregoing summary and the following detailed description are exemplary and not restrictive of the scope of the invention.

DETAILED DESCRIPTION

This invention relates to a system and method for utilizing rules to protect against malware. The invention protects computers or computer systems by focusing protective efforts on the functions and actions that malware attempts to perform in or on a target computer system rather than focusing on malware code. The invention utilizes rules to automatically determine which functions or actions are permitted and which functions or actions are malicious (and thus not permitted). The use of rules in this manner eliminates the need for many or all user or human-based decisions, some of which may be erroneous, to protect against the harmful effects of malware. A set of well-reasoned rules capable of making largely correct decisions on attempted malicious actions within a computer system provides a layer of protection against malware that is independent of ever evolving malware code.

In some instances, the rule-based system and method of the invention may be used alongside other types of anti-virus or malware protection systems such as, for example, signature-based systems, to provide multiple layers of protection for a computer system. In other instances, the rule-based system and method of the invention may provide effective malware protection when used alone.

Figure 1:
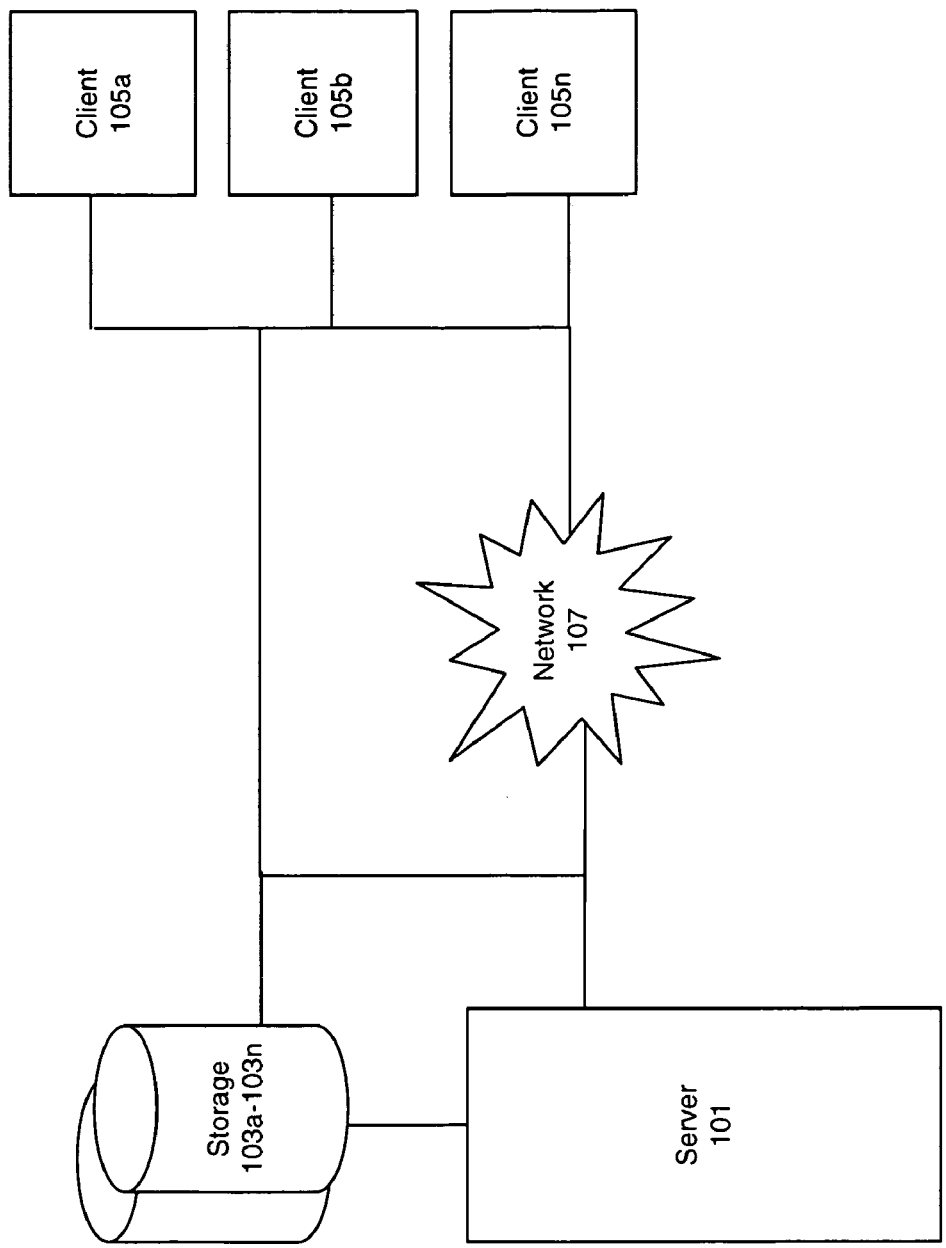
FIG. 1 illustrates a computer system according to an embodiment of the invention.

FIG. 1 illustrates a computer system 100, which may be protected from malware by the invention. Computer system 100 may include a server 101, one or more data storage devices 103a-103n, one or more client devices 105a-105n, and/or other elements. Client devices 105a-105n may include personal computers, laptop computers, servers, personal digital assistants (PDA's), personal email devices, cell phones, or other devices. Server 101, data storage devices 103a-103n, client devices 105a-105n, and/or other elements of computer system 100 may constitute a computer network. However, network 107 may be included in computer system 100 and/or may connect one or more elements of computer system 100. Network 107 may include any one or more of, for instance, the Internet, an intranet, a PAN (Personal Area Network), a LAN (Local Area Network), a WAN (Wide Area Network), a SAN (Storage Area Network), or a MAN (Metropolitan Area Network). Any suitable communications link may be utilized, including any one or more of, for instance, a copper telephone line, a Digital Subscriber Line (DSL) connection, a Digital Data Service (DDS) connection, an Ethernet connection, an Integrated Services Digital Network (ISDN) line, an analog modem connection, a cable modem connection, or other connection.

In one embodiment, the invention may include a plurality of predetermined rules. Each of the rules in the plurality of rules may indicate that a function of a certain type may not be performed on a specific object within computer system 100. For example, in one embodiment, there may be two types of rules that prevent two main types of functions: update rules, which prevent the update of specific objects within computer system 100, and deletion rules, which prevent the deletion of specific objects within computer system 100. Other rules preventing other types of functions may exist within the scope of the invention.

Figure 2:
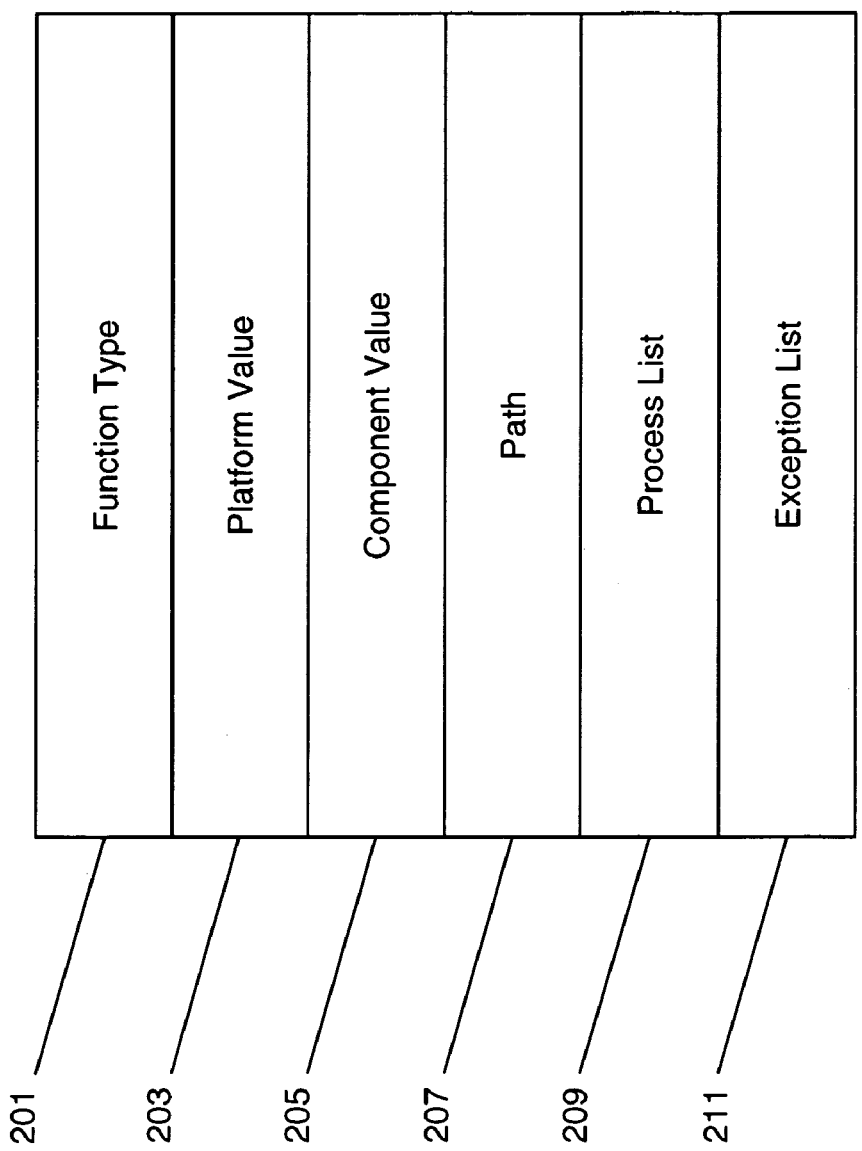
FIG. 2 illustrates rule structure according to an embodiment of the invention.

In one embodiment, each rule from the plurality of rules may comprise one or more parts that dictate the functional characteristics of the rule. FIG. 2 illustrates an example of the structure of a rule 200 according to an embodiment of the invention. Rule 200 may include 5 parts such as, for example, a platform value 203, a component value 205; a path 207; a process list 209; and an exception list 211. Rules having more or fewer parts may also be used in the invention. As stated above, rules may also be identified as having a function type that identifies the type of functions the rule prevents. As such, rule 200 may also include a function type 201.

As mentioned above, a rule's function type identifies the types of functions that are not allowed to run or act on a specific object within the computer system. For example, if function type 201 of rule 200 specified update functions, then the specific object to which rule 200 applied would not be able to be updated (e.g., write requests or similar calls to the object would be disabled). If function type 201 of rule 200 specified deletion functions, then the specific object to which rule 200 applied would not be able to be deleted (e.g., delete requests or similar calls to the object would be disabled).

A rule's platform value may identify the platform to which the rule applies. A platform may include the specific element or type of element of computer system 100 that the rule applies to or may indicate the specific operating system to which the rule applies (e.g., the object on which the rule operates must exist on the specified element or type of element on computer system 100 or must operate within this operating system on an element of computer system 100). By specifying a platform value for each rule, a single rule set (e.g., the plurality of rules) may be utilized for multiple platforms without burdening elements of computer system 100 with rules that only apply to other elements or operating systems. For example, if platform value 203 of rule 200 specified Linux® operating systems, then rule 200 would only apply to objects that exist on elements of computer system 100 that ran a Linux® operating system. If platform value 203 of rule 200 specified Windows NT operating systems, then rule 200 would only apply to objects that exist on elements of computer system running Windows® NT operating systems. Other types of platforms may be specified.

A rule's component value specifies the type of object upon which the rule is to operate. For example, in one embodiment, component value 205 of rule 200 may specify whether a rule applies to a file object within a computer system or a registry object within the computer system. A file object may include a directory or file within a computer system. A registry object may include a registry key or a registry value within a computer system. The registry is used by Microsoft Windows based operating systems to maintain settings used by the operating system as well as other software. It is arranged in structures called keys and values. Keys are containers that may contain other keys or values. Values are actual data that have an associated type (string, multi-string, DWORD). A value must belong to a key. In order to access values, a handle must be created for the key first. That handle is used by the operating system to indicate where the value is placed within the key hierarchy. Other types of objects may be specified by the component value of a rule.

A rule's path may include a regular expression that defines the specific object (e.g., directory, file, registry key, registry value, or other object) that the rule applies to. For example, if path 207 of rule 200 specified "C:\programfiles\obj1.doc", then rule 200 applies to the object within computer system 100 to which that path pointed (object: obj1.doc, in directory: programfiles, on the C drive).

In one embodiment, computer system 100 may include multiple elements, each having objects that share the same path name. For example, client devices 105a and 105b of computer system 100 may each have a "C" drive. On each C drive, there may exist a directory "programfiles," each containing a file called obj1.doc. As such, there may be multiple objects with the path C:\programfiles\obj1.doc. If the plurality of rules is applied across computer system 100, one rule from the plurality may apply to both objects. As such, malicious functions that attempt to operate on the obj1.doc file may be thwarted on each client device by a single rule. The plurality of rules may be applied across computer system 100 in multiple ways. In one embodiment, the plurality of rules may be applied to objects within the computer system from a central source such as, for example, server 101 (a single set of rules is applied to each element across network 107). In another embodiment, the plurality of rules may be applied to objects within the computer system by each machine (e.g., a single set of rules is copied to each machine and applied locally to local objects).

In one embodiment, a computer system having multiple elements may also have objects with unique path names. For example, server 101 of computer system 100 may have an "X" drive. This may be the only "X" drive on computer system 100. As such, an object with a path name X:\programfiles\obj2.doc may be the only such object on computer system 100. A rule that specifies the path name U:\programfiles\obj2.doc, may only apply to a single object within computer system. Similarly, if computer system 100 only included one element such as, for example, a single computer (e.g., a personal computer) then the "C" drive of the single computer may specify unique addresses within the computer system.

In one embodiment, the process list of a rule may include a specified list of processes to which a rule does not apply. When process list 209 of rule 200 is blank, the rule acts to prevent all functions of function type 201 from being performed on the object specified by path 207. For example, if function type 201 of rule 200 specified update functions, no updates could be performed on the object specified in path 207 of rule 200 (all updates would be disabled) when process list 209 is blank.

It may be desirable to exclude certain processes from being blocked or prevented by a rule. These processes may be recognized as part of the normal operations of computer system 100 and thus it may not be desirable to block them. As such, these desirable process may be identified on the process list. For example, in an update rule, install.exe, msiexec.exe, wupdmgr.exe or other processes may be put on the process list so that the rule does not apply to them, as these types of install programs are likely to perform legitimate operations.

The exception list of a rule may specify a list of exceptions that apply to the rule. In some embodiments, an exception operates to allow a function when the rule would otherwise prevent it. In other embodiments, an exception may operate to prevent a function when it is otherwise affirmatively allowed by a rule. Exceptions may be structured exactly the same as rules and thus, may be considered rules themselves. That is, an exception may have a platform value, a component value, a path, a process list, and its own exception list. An exception may be invoked when it is found on the exception list of a rule. For the exception to be successfully invoked, it must be of the same rule type (e.g., update or delete) as the rule to which it applies and must have the same platform value and component value as the rule to which it applies.

As mentioned above, exceptions allow functions that a rule would otherwise disable and disable functions that a rule would otherwise allow. In one embodiment, if an exception happens to be more general than the rule itself, the effect of the rule may be negated altogether. For example, if rule 200 specified that any file that matches the regular expression 'c:*.exe' may not be updated, and an exception to rule 200 were created that any file matching the regular expression 'c:*' may be updated, then rule 200 would be negated. However, an exception has no impact outside the scope of its rule. For example, if rule 200 prevents the update of all .exe files, and exception list 211 identifies an exception "EX01" that allows updates to all files in the C drive, then the exception only applies to .exe files on the C drive, and will not allow update to other files on the C drive.

Due to the complex rule/exception structure, the invention enables layers of complexity that precisely identify what functions to prevent so that malicious operations of malware can be successfully blocked and so that normal operation of the computer system continues unfettered.

An example of rule action on objects within computer system 100 may include: if function type 201 of rule 200 specifies update functions and component value 205 of rule 200 specifies a file object (and path 207 points to a file object), then rule 200 acts to prevent updates to file objects. If the file object that path 207 points to is a file, then rule 200 prevents updates to that file (except those performed by any processes on process list 209 or otherwise allowed by exceptions on exception list 211).

As mentioned above, file objects may include files and directories. Any rules that apply to file objects that are directories apply to the directory itself and everything under the directory (e.g., files and other directories). In some embodiments, there may be no write calls allowed to a file object that is a directory. As such, if rule 200 is an update rule, component value 205 specifies a file object, and the file object that path 207 points to is a directory, then rule 200 prevents updates to all of the files in the directory. Delete calls to a directory may be allowed. As such, a delete rule would prevent deletion of the directory itself as well as all the files in the directory.

If component value 205 of rule 200 specifies a registry object, the action of the rule may depend on the particular type of registry object. For example, if path 207 points to a registry value, a delete rule (function type 201 specifies delete functions) would prevent deletion of the registry value. If the function type 201 specified update functions, rule 200 it would prevent setting of the registry value. If, however, path 207 pointed to a registry object that is a key, then rule 200 would apply to updates or deletions to the key itself, and everything under that key. As such, when a key is opened, it must be determined whether the rule applies to a parent key as well as the current key. When a process wishes to query or set a value, it must first create a handle, or open, the key. When a key is contained within another key, that other containing key is considered to be the parent of the contained key.

If no rule exists for an object within the computer system, then all functions will be allowed to act on that object.

In some embodiments, some or all of the plurality of rules may be "hardcoded" into an administrative application, one or more modules, and/or other elements of a system of the invention. For instance, if an administrative application according to the invention were prepared by a software provider and provided to a user entity for use in the user entity's computer system, the administrative application and its associated modules may include a "generic" plurality of rules designed to protect against a large percentage of malware threats. In some embodiments, the software provider may further customize the generic plurality of rules for distribution to different types of user entities (e.g., according to the industry in which a user entity operates), for distribution to specific user entities (e.g., customization according to specific information provided by a user entity), and/or may perform other customization.

In some embodiments, the action achieved by a generic plurality of rules may be altered or customized by a user entity. For example, a user entity may desire to modify the effect that the plurality of rules has on a protected system. This modification may serve to block more or less of the functions attempting to run on the computer system. In some embodiments, modification may be achieved by the user entity altering or adding to the generic plurality of rules (e.g., adding rules, deleting rules, modifying rule properties—e.g., process lists, exceptions, etc.—, or other modification). For example, a user entity may cause the plurality of rules to allow a previously blocked function by creating a rule that allows the function (especially in instances wherein a detected function is allowed to run if one rule allows it, regardless of how many others prevent it). A user may also allow a previously blocked rule by adding the process to the process list of a rule directed to the same object. Similarly, a user entity may cause a previously allowed rule to be blocked by creating a rule that blocks the function or by deleting the process from process lists of rules directed to the same object. Other modifications altering rule action may be made.

Figure 3:
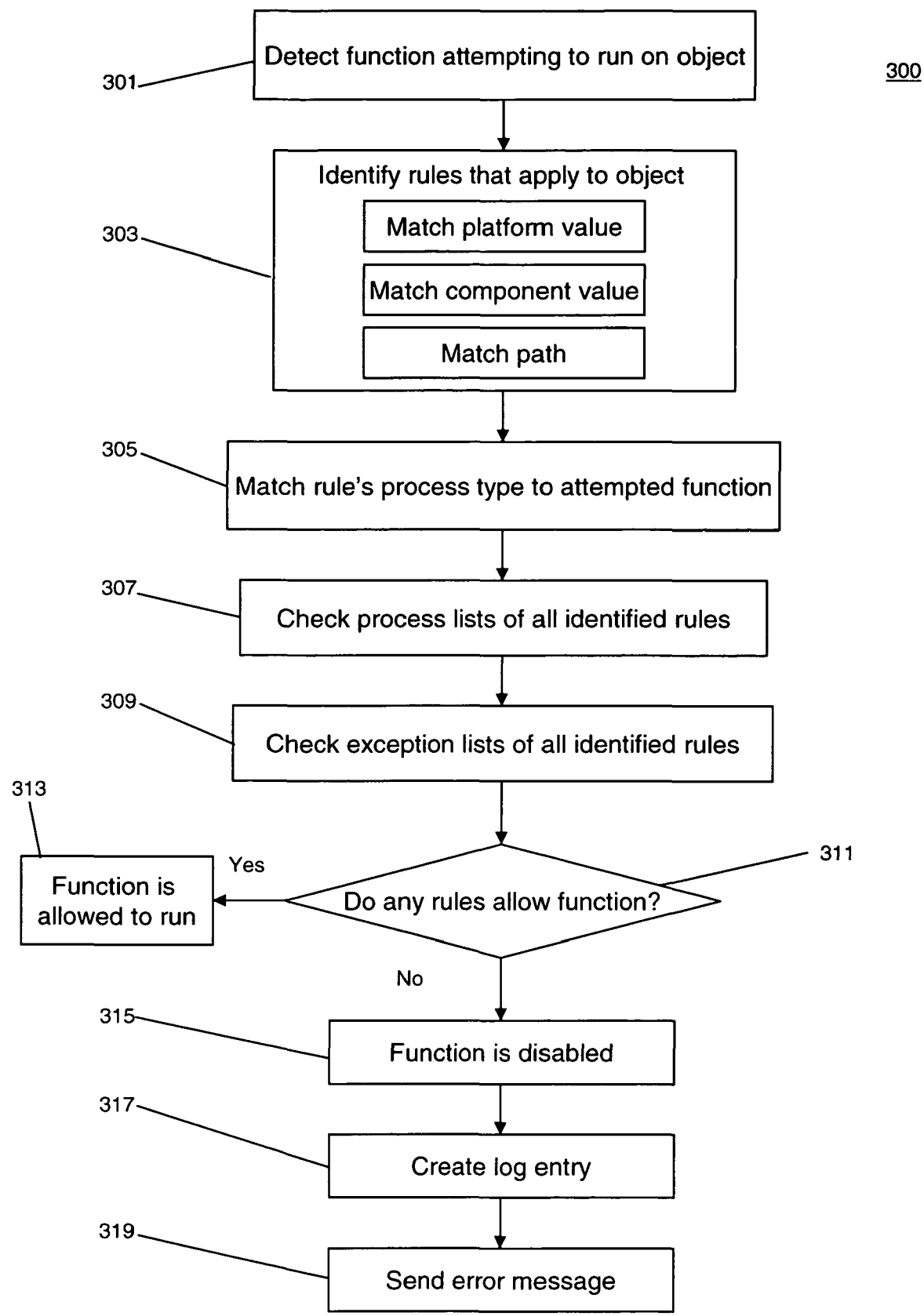
FIG. 3 illustrates a method for protecting a computer system from malicious or harmful software according to an embodiment of the invention.

FIG. 3 illustrates a method 300 according to an embodiment of the invention, wherein the invention protects against malicious or harmful software by utilizing the plurality of rules when potentially malicious processes attempt to run or act on objects within computer system 100 (or other computer systems). Process 300 includes an operation 301, wherein a function that is attempting to run or act on an object within computer system 100 is detected and intercepted (e.g., it is not allowed to continue). The function may originate from a program, module, or other source from within computer system 100 or may come from outside of computer system 100 (such as via network 107). In an operation 303, the plurality of rules may be searched to identify one or more rules that apply to the object on which the function is attempting to act. When identifying one or more rules from the plurality that apply to the object, the platform value of each rule may be checked to see if it matches the platform on which the object resides. The component values of the rules may also be checked to see if they specify an object type corresponding to the object. Finally, the paths of the rules may be checked to see if any of the rules point to the object on which the function is attempting to act.

In an operation 305, the function type of one or more identified rules (i.e., those that are applicable to the object) are checked to see if they match the type of function attempting to act on the object (e.g., if the attempted function is an update function, are any of the identified rules update rules?). Alternatively, the plurality of rules may be checked for function types that match the attempted function prior to identifying whether one or more rules in the plurality of rules apply to the object.

If the function attempting to act on the object matches the function type of any of the identified rules that apply to the object, then absent other circumstances, the function is not permitted to act on the object and it is disabled. However, in an operation 307, the process is first checked against the process lists of all of the identified rules to see if the function is allowed by any of the rules. If the process lists of the identified rules are empty, then all functions of that function type are disabled by the rules.

In an operation 309, the attempted function is checked against the identified rules to see if any exceptions apply that would allow an otherwise disabled function or disable an otherwise allowed function. If, in an operation 311, after consulting the process lists and exception lists of the identified rules, the specific attempted function is allowed by any of the rules, it is allowed to act on the object in an operation 313. If, in operation 311, all of the rules prevent the function, the function is disabled in an operation 315.

In one embodiment, the invention classifies the detected function that is attempting to act on an object within the system as either "acceptable," "unacceptable," or "suspicious." These classifications are exemplary only, other classifications may also exist. The plurality of rules associated with the system are used to apply these classifications to the detected function.

A detected function may be "acceptable" if an examination of the rules indicates that the function is not malicious, and thus allowed to act on its intended object within the system. This classification may result from several instances such as, for example, where no rule exists for the object on which the detected function is attempting to run, where a rule affirmatively allows the function to run (e.g., the detected process is on a rule's process list), or in other circumstances.

Disabled functions may include functions that are "unacceptable" or "suspicious." A function may be unacceptable if the rule preventing it was instituted because the function is known to cause harm (or if there is a very high likelihood that the function causes harm in the circumstances under which the rule operates). A function may be suspicious if the rule preventing its action was instituted because the circumstances under which the rule operates indicate that the function may be harmful, but that knowledge is uncertain. In these instances, the suspicious function may be intercepted (not allowed to run), alerts may be sent to one or more users or administrators, and a decision may be made as to whether or not to allow the suspicious function to run.

In one embodiment, function flags may be used by rules to distinguish between rules that disable unacceptable functions and rules that disable suspicious functions. For instance, if a rule were instituted to disable unacceptable functions, its action upon a detected function may associate that function with a function flag that indicates that the disabled function is unacceptable; thus indicating, other than logging the results, no further action is needed. However, if a rule were instituted to disable suspicious functions, the rule may associate the function with a function flag that indicates that a user, administrator, or other entity should be alerted of the disabled function and that further action is required. As such, any particular rule that acts to disable functions may be classified as an "unacceptable function rule" or a "suspicious function rule," according to the flags it associated with disabled functions.

In an operation 317, a log entry is created regarding the disabled function. In some embodiments, the log entry may include the identity of the function that was disabled, the origin of the function (e.g., program, application, module or other source) that was disabled, the identity of the one or more rules that disabled the function, the identity of the object (e.g., path/element information), and/or other information. The log entry may be entered into the system event log of the device/element of computer system 100 where the object exists. In some embodiments, a log entry may also be entered into the general event log of computer system 100. Other log entries may be created. Although not shown, after operation 313 (the function is allowed to run), a log entry containing similar information may be created. In an operation 319, an error message may be sent to the application, program, module, or other source of the disabled function (e.g., the caller) indicating that the process was disabled. In some embodiments, similar error messages may be sent to an administrator of the computer system. These messages may be sent via email or other communication method.

Figure 4:
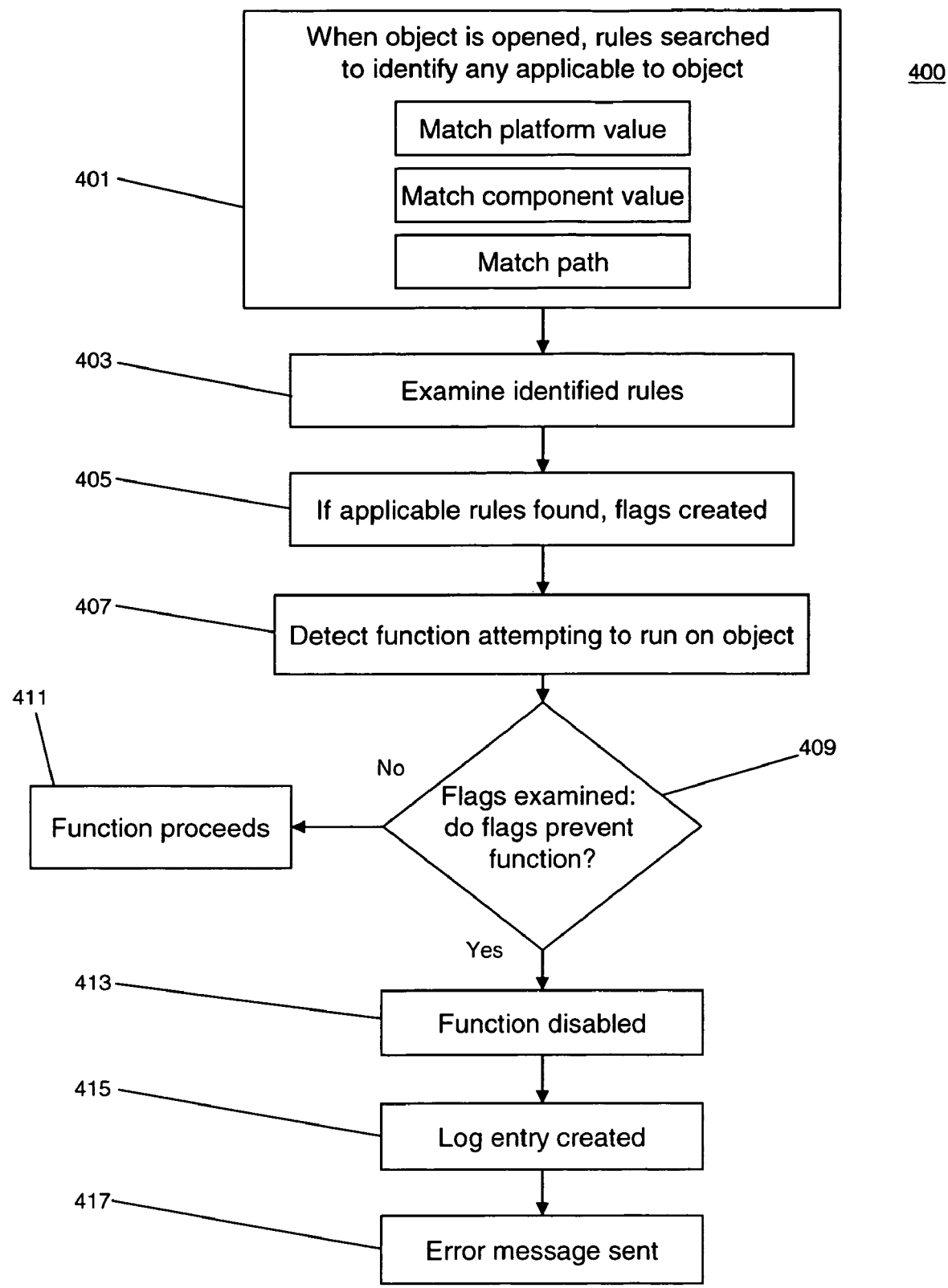
FIG. 4 illustrates a method for using flags to protect a computer system from malicious or harmful software according to an embodiment of the invention.

FIG. 4 illustrates a method 400 according to an embodiment of the invention wherein computer system 100 (or other computer system) may be protected using object flags. In one embodiment, object flags may be considered attributes of an object within a computer system. As such, the object flags may also be referred to as "object attributes." Process 400 includes an operation 401, wherein an object such as, for example, a file, is opened, and the plurality of rules are searched to determine whether one or more of the rules apply to the object. This process may include determining whether there are any rules in the plurality of rules that have platform and component values that match the platform on which the object exists, the object type of the object, and determining whether the rule's path points to the object. If no rules apply to the object, then the open continues.

In an operation 403, if one or more rules are identified that apply to the opened object, these one or more identified rules may be examined to determine their impact on the object. In one embodiment, the function types, process lists, and/or exception lists of the identified rules are examined to determine their impact on the object.

Objects within the computer system may be capable of association with one or more object attributes or object flags. In an operation 405, one or more object flags may be associated with the object based on the impact of the identified rules on the object. For example, if the identified rules collectively indicate that the object should not be updated by any process, then a "no-update" object flag will be associated with the object. Similarly, if all of the rules applicable to the object collectively indicate that the object should not be deleted, then a "no-delete" object flag will be associated with the object. If the object is a directory, then all of the files and sub-directories within the directory are also associated with a "no-delete" object flag. The object flags would operate similarly upon registry objects within a computer system. However, because each rule has a process list that determines certain allowed processes and an exception list that specifies exceptions to the rule, simple "no-update" or "no-delete" object flags may not always be sufficient. For example, some of the identified rules may allow update or deletion of the object by specific processes listed in their process lists. In another example, an otherwise allowable function may be blocked by an exception in the exception list. As such, additional object flags may be associated with the object to represent the details of prohibited/allowed functions for the object.

For example, if a rule being used to apply object flags to an object includes one or more processes that are allowed to act on the object (i.e., the process list of the rule includes one or more processes), the object will be associated with an object flag that indicates that process list has one or more processes specified thereupon. This object flag may not specify the specific processes allowed to act upon the object, but serves as a pointer to the process list (e.g., to a database including the process list). As such, when a function is attempting to act upon the object and the method/system of the invention examines the object flags associated with the object, it is directed to the stored process list to determine if the function originating from a process on the process list (e.g., the function is allowed). Application of object flags for exceptions occur at the same time as other application of other object flags, as exceptions are themselves rules (except that any processes specified in the process list of an exception are dealt with similar to other process lists, as described above).

In an operation 407, a function that is attempting to act on the object is detected. This function may be a potentially malicious function that originates from harmful or malicious software. When the attempted function tries to act on the file, the function is "hooked" (interrupted), and, in an operation 409, the object flags associated with the file are examined to determine whether the specific function is allowed to run on the particular object in question. If, in operation 409, it is determined that the object flags do not prevent the attempted function from running on the object, then the function may continue in an operation 411. There may be several ways that it may be determined that a function is allowed to act on the object. For example, there may be no rules applicable to the object or no rules of the same function type as the attempted function applicable to the object. If there are no rules from the plurality of rules that are applicable to the object, no object flags will be created for the object and all functions attempting to act on the object will be allowed to do so. If there are no rules of the same function type as the attempted function, then all functions of that type will be allowed to act on the object.

In other instances, there may be rules applicable to the object and object flags associated with the object, but one or more of the rules applicable to the object may specifically allow the attempted function to act on the object (as mentioned above, if any rules applicable to the object allow a function, it is allowed to act on the object regardless of other rules that would otherwise block the function). This may be because the attempted function originates from a process on the process list of one of the rules applicable to the object. It may also be because the attempted function is allowed by an exception to one of the rules applicable to the object. In either case, the object flags associated with the object will indicate that the attempted function is allowed to act on the object, as discussed above.

If, in operation 409, it is determined that the object flags associated with the object prevent the attempted function from running, the attempted function is disabled in an operation 413. The object flags may prevent the attempted function from running, for example, if a function makes a write request to the object (e.g., an update) and there is a "no-update" object flag associated with the object. The object flags may also prevent the attempted function from running if a no-update object flag is associated with the object that allows some functions to act on the object (e.g., those originating from processes on the process list of the corresponding rule), but the attempted function does not originate from one of the allowed processes. As such, the attempted process will not be allowed to write to the object. In an operation 415, a log entry may be created of the disabled function. The log entry may include the identity of the disabled function, the origin of the disabled function (e.g., program, application, module, or other source), the rule or rules that prevented the function from acting, the identity of the object (e.g., path), and/or other information. The log entry may be entered into the system event log of the device/element of computer system 100 where the object exists. In some embodiments, a log entry may also be entered into the general event log of computer system 100. Although not shown, after operation 411 (e.g., the function has been allowed to run), a log entry containing similar information may be created. Other log entries may be created. In some embodiments, an error message will also be returned to the application, program, module, or other source of the process (e.g., the caller) indicating that the function was disabled. In some embodiments, similar error messages may be sent to an administrator of the computer system. These messages may be sent via email or other communication method. In some embodiments, the log entries and/or error messages may be used to create reports regarding attempted functions and rule action within the computer system. These reports may be specific to a particular element/device in computer system 100, may encompass groups of elements/devices on computer system 100, or may encompass the entirety of computer system 100.

In some embodiments, application of rules and association of flags may differ for registry objects (as opposed to file objects). Registry objects may include registry keys and registry values. When a registry key on computer system 100 is opened, the plurality of rules are checked to determine whether any of the rules apply to values within that key. Any rules applying to values within the key are associated with a list of rules for the handle of that key. When a process attempts to set a registry value (e.g., an update attempt) or delete a registry value (e.g., a delete attempt), the list of rules associated with the handle of the key in which the registry value resides is searched for rules that apply to the registry value. If any rules are found that apply to the registry value and that prevent the particular function (e.g., prevent setting the value or deleting of the value), the function is disabled and a log entry is created similar to the methods described above.

If a rule applies to a registry key itself (e.g., the path of the rule points to a registry key), then the rule will also be associated with a list of rules for the handle associated with that key. The rule then applies to the key itself and all the values under the key. When the key is initially opened, the driver must determine if the rule applies to a parent key of the key as well as the current key. This determination is made by also checking all the parent keys of the current key. The driver is kernel mode code that intercepts attempts to alter the registry. If a rule applies to the key itself, flags will be associated with the registry handle indicating whether certain processes are allowed to update or delete the key. The association and operation of object flags with registry objects work in a similar manner as that of file objects discussed above.

Figure 5:
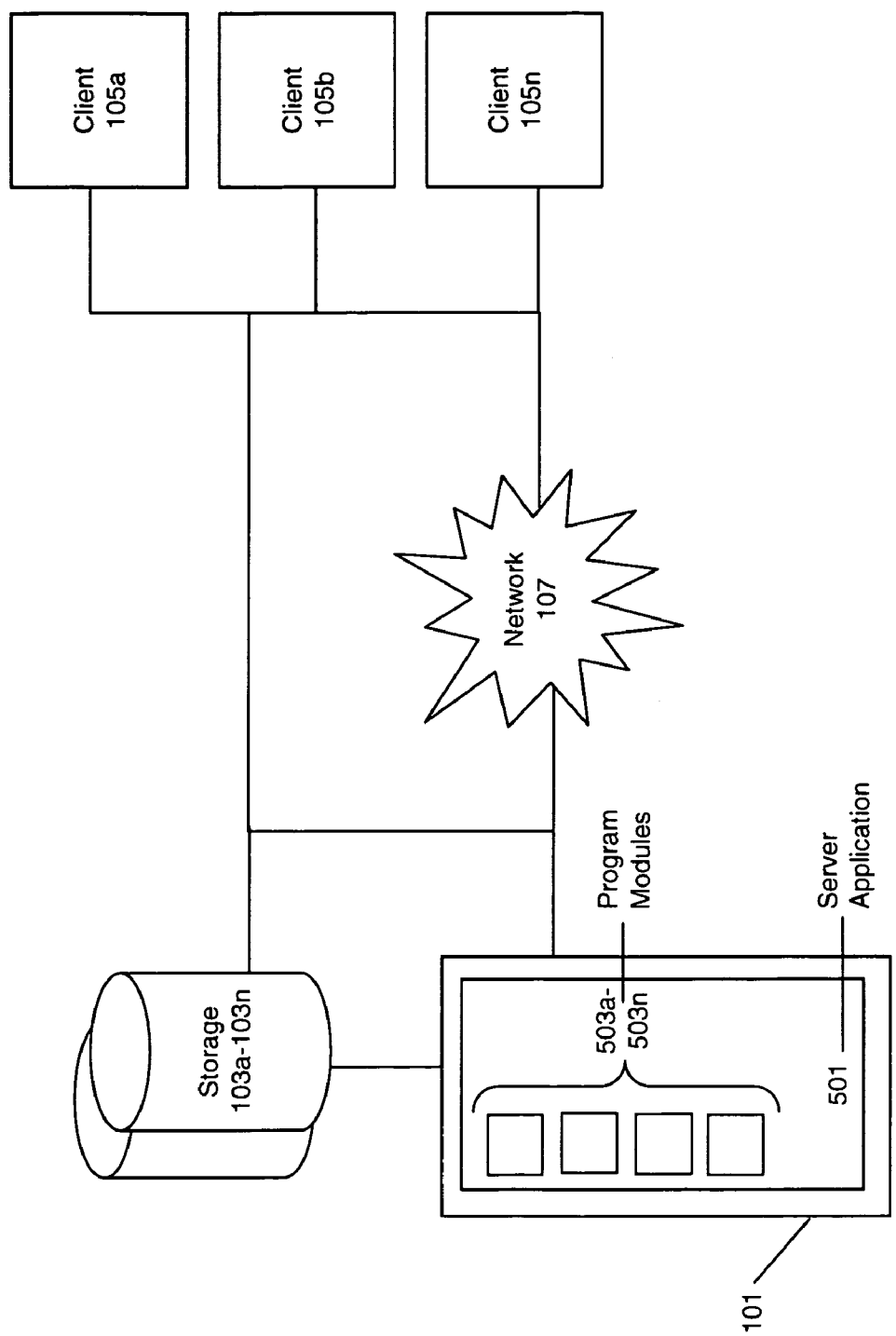
FIG. 5 illustrates a system for protecting a computer system according to an embodiment of the invention.

In one embodiment, the invention provides a system for protecting a computer system from malicious or harmful software. FIG. 5 illustrates a system 500 according to an embodiment, wherein one or more rules are used to provide automated protection from malicious or harmful software. As mentioned above, the system of the invention may include many of the elements of the computer system which the invention protects. For example, in one embodiment, system 500 may include server 101, one or more data storage devices 103a-103n, one or more client devices 105a-105n, network 107, and/or other elements. System 500 may comprise and/or enable any or all of the various elements, features, functions, and/or processes of the invention described herein.

In one embodiment, system 500 may also include an administrative application 501, one or more modules 503a-503n, and/or other elements. Administrative application 501 may include a driver or computer application for creating and administering a plurality of rules within computer system 500. In one embodiment, administrative application 501 may include one or more modules 503a-503n for creating and/or altering rules, identifying rules that apply to objects within computer system 500, matching characteristics of rules (e.g., platform values, component values, paths, or other characteristics) to objects within computer system 500, detecting and intercepting functions attempting to act on objects within computer system 500, associating flags with objects within computer system 500, examining rules and/or flags to determine whether a function is allowed or blocked (e.g., examining, function types, process lists, exceptions lists, considering rules/flags collectively, or other information), disabling functions attempting to act on objects within the computer system, allowing functions attempting to act on objects within the computer system to run, creating log entries, sending error messages, creating reports, or for performing other operations within the invention.

In particular, administrative application 501 may include a detector module for detecting and intercepting functions attempting to act on objects within computer system 500 or for performing other operations of the invention. Administrative application 501 may also include a comparator module for comparing characteristics of the plurality of rules (e.g., platform values, component values, paths, or other characteristics) to objects within computer system 500 or otherwise identifying rules from the plurality of rules that apply to objects within computer system 500. Administrative application may also include a flagging module that may examine one or more rules that are applicable to an object and associate one or more flags with the object that reflect the applicable functions for the object (if any). Administrative application 501 may also include a disabler module that examines rules and/or flags (e.g., function types, process lists, exception lists, considering rule/flags collectively, or examining other information) to determine their impact on an object. The disabler module may also determine whether an attempted function is prevented from acting on an object within computer system 500 by the rules/flags applicable to or associated with the object. The disabler module may also disable any attempted functions that are indicated as blocked from acting on an object by rules and/or flags. In one embodiment, the disabler may also send an error message regarding the disabled function to the program, module or other origin of the function. The disabler may also send other messages regarding the disabled function to other destinations. Administrative application 501 may also include a recorder module that creates log entries regarding disabled or allowed functions. Other modules performing other processes, features, or functions of the invention may also exist. One or more of modules 503a-503n may be combined. For some purposes, not all modules may be necessary.

In one embodiment, administrative application 501 may be part of an administrative entity that manages and/or administrates the rules. The administrative entity may include a person who is familiar with the computer system and the goals to be accomplished by the rules. The administrative entity may also include server 101, modules 505a-505n, and/or other elements.

In one embodiment, the administrative entity may create the plurality of rules that apply to objects within computer system 500. In some embodiments, the plurality of rules may be created as a set of completely custom rules for computer system 500. In another embodiment, a generic set of rules may be provided to the administrative entity for use on computer system 500, as many computer systems may have similar attributes and may encounter similar problems. The administrative entity may then manipulate the generic set of rules, as necessary, into the plurality of rules for use by computer system 500. These manipulations may be necessary due to certain characteristics of computer system 500 or to guard against particular malware threats. For instance, the plurality rules may be manipulated from a standard set of rules by the administrative entity to enhance security for certain software that is especially crucial on computer system 500. In another example, the plurality of rules may be manipulated from a standard set of rules to place tight security on certain, more threat-vulnerable, client devices or other elements of computer system 500. Other manipulations or customizations may be made for other reasons.

In one embodiment, the plurality of rules may be stored in a memory such as one or more of data storage devices 103a-103n. Data storage devices 103a-103n may be, include, or interface to, for example, an Oracle™ relational database sold commercially by Oracle Corporation. Other databases, such as Informix™, DB2 (Database 2) or other data storage or query formats, platforms, or resources such as OLAP (On Line Analytical Processing), SQL (Standard Language Query), a SAN (storage area network), Microsoft Access™ or others may also be used, incorporated, or accessed into the invention. Data storage devices 103a-103n may include any combination of databases or other data storage devices, and may receive and store information regarding the plurality of rules of the invention.

In some embodiments, the plurality of rules may be stored on other elements of computer system 500. In one embodiment, a copy of the plurality of rules may be distributed and stored locally on some or all of the elements of computer system 500, including some or all client devices 105a-105n. In one embodiment, the plurality of rules may be stored in a central location such as, for example, server 101 or one or more data storage devices 103a-103n and administrated to some or all of the elements of the system by the administrative entity.

In one embodiment, the administrative entity may set up the rules on an administrative server such as, for example, server 101, as a set of policies. These policies may then be assigned to client devices such as, for example, client devices 105a-105n or other elements of computer system 500, using a generic policy architecture.

In some embodiments, the plurality of rules may be specified in an installation configuration file that runs when a client device or other element is added to computer system 500. In this case, the plurality of rules are in place immediately after the client device is installed on computer system 500. In another embodiment, the rule set for a client device on computer system 500 may be initially empty. In this case, the client device will not be protected until it has been discovered by the administrative entity and the plurality of rules are specifically applied to it. In another embodiment, a client device on computer system 500 may include a local graphical user interface (GUI) for setting up rules on that device. This local GUI may be locked by the policies of the computer system so that the device will not operate until the rules are set up on the device.

When the policies for computer system 500 are applied to a particular client device, the plurality of rules may be given to the appropriate driver via, for example, an ioctl call. The plurality of rules may then be enforced immediately. In some embodiments, the plurality of rules may be stored in the registry of an element of computer system 500 so that they may be immediately restored when the element is rebooted.

Those having skill in the art will appreciate that the invention described herein may work with various system configurations. Accordingly, more or less of the aforementioned system components may be used and/or combined in various embodiments. It should also be understood that various software modules 503a-503n and administrative application 501 that are utilized to accomplish the functionalities described herein may be maintained on one or more of server 101, client devices 105a-105n, or other components of system 100 or system 500, as necessary. In other embodiments, as would be appreciated, the functionalities described herein may be implemented in various combinations of hardware and/or firmware, in addition to, or instead of, software.

While the invention has been described with reference to the certain illustrated embodiments, the words that have been used herein are words of description, rather than words of limitation. Changes may be made, within the purview of the associated claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the associated claims.

What is claimed is:

1. A method for preventing a malicious or unwanted software function from acting upon an object within a computer system, the method being executed by one or more processors configured to perform a plurality of operations comprising:

determining a rule from a plurality of pre-existing rules that applies to an object within a computer system, wherein each of the plurality of pre-existing rules is associated with a plurality of characteristics including: a platform indicator that specifies a type of platform on which an object to which the rule applies operates, an object type indicator that specifies a type of object to which the rule applies, an object indicator that specifies a specific object to which the rule applies, and a function type indicator that specifies a function type that triggers an action with regard to the object, and wherein determining a rule that applies to the object includes determining a rule from the plurality of pre-existing rules that includes: a platform indicator that matches a platform on which the object operates, an object type indicator that matches an object type of the object, and an object indicator that matches the object;

associating object attributes with the object according to the rule, wherein the object attributes include a function type of the function type indicator and a classification that indicates a specific action to be performed with regard to the object;

detecting a software function attempting to act upon the object;

determining whether the detected software function matches the function type of the object attributes; and performing the specific action when the detected software function matches the function type of the object attributes, wherein the specific of action relates to whether the detected software function will be allowed to act upon the object, and wherein the specific action performed is determined using the classification of the object attributes.

2. The method of claim 1, wherein the specific action includes:
- preventing the software function from acting upon the object when the classification indicates that the software function is to be prevented from acting upon the object;
- allowing the software function to act upon the object when the classification indicates that the software function is allowed to act upon the object; and
- seeking manual approval before allowing the software function to act upon the object when the classification indicates that manual approval is required before the software function is allowed to act upon the object.

3. The method of claim 2, wherein the manual approval includes alerting at least one user that the software function requires review prior to acting upon the object.

4. The method of claim 1, wherein the function type of the detected software function comprises one of:
- an update function that attempts to update the object; or
- a delete function that attempts to delete the object.

5. The method of claim 1, wherein the object type of the object is one of a file object or a registry object.

6. The method of claim 1, wherein the object indicator includes a path attribute identifying the object.

7. The method of claim 1, wherein the rule includes a list of one or more specific processes, wherein the object attributes include identifiers for each of the one or more specific processes, and wherein performance of the specific action is dependent on whether the detected software function is a process listed on the list.

8. The method of claim 7, wherein the detected software function has a function type matching the function type of the object attributes and the classification indicates that the detected software function should be prevented from acting upon the object, and wherein the specific action includes allowing the detected software function to act on the object when the detected software function is a process that is one of the one or more specific processes.

9. The method of claim 1, wherein the rule includes an exception list specifying one or more exceptions, wherein each exception is one of the plurality of preexisting rules, wherein the detected software function has a function type matching the one or more attributes and wherein the specific action is altered by the one or more exceptions.

10. The method of claim 1, further comprising creating a log entry when the specific action prevents the software function from operating on the object, wherein the log entry includes one or more of:
- information regarding an identity of the detected software function;
- an identity of the object; and
- an identity of the rule.

11. A system for preventing a malicious or unwanted software function from acting upon an object within a computer system, the system comprising:
- at least one memory device upon which the plurality of pre-existing rules are stored, wherein each of the plurality of pre-existing rules is associated with a plurality of characteristics including: a platform indicator that specifies a type of platform on which an object to which the rule applies operates; an object type indicator that specifies a type of object to which the rule applies, an object indicator that specifies a specific object to which the rule applies, and a function type indicator that specifies a function type that triggers an action with regard to the object; and
- at least one computing device configured to:
  - determine a rule from the pre-existing plurality of rules that applies to the object within the computer system, wherein determination of the rule that applies to the object includes a determination of a rule from the plurality of pre-existing rules that includes: a platform indicator that matches a platform on which the object operates, an object type indicator that matches an object type of the object, and an object indicator that matches the object,
  - associate object attributes with the object according to the rule, wherein the object attributes include a function type of the function type indicator and a classification that indicates a specific action to be performed with regard to the object,
  - detect a software function attempting to act upon the object,
  - determine whether the detected software function matches the function type of the object attributes, and
  - perform the specific action when the detected software function matches the function type of the object attributes, wherein the specific of action relates to whether the detected software function will be allowed to act upon the object, and wherein the specific action performed is determined using the classification of the object attributes.

12. The system of claim 11, wherein the specific action includes:
- prevention of the software function from acting upon the object when the classification indicates that the software function is to be prevented from acting upon the object;
- allowance of the software function to act upon the object when the classification indicates that the software function is allowed to act upon the object; and
- acquisition of manual approval before allowing the software function to act upon the object when the classification indicates that manual approval is required before the software function is allowed to act upon the object.

13. The system of claim 11, wherein the rule includes a list of one or more specific processes, wherein the object attributes include identifiers for each of the one or more specific processes, and wherein performance of the specific action is dependent on whether the detected software function is a process listed on the list.

14. The system of claim 13, wherein the detected software function has a function type matching the function type of the object attributes and the classification indicates that the detected software function should be prevented from acting upon the object, and wherein the specific action includes allowance of the detected software function to act on the object when the detected software function is a process that is one of the one or more specific processes.

15. The system of claim 11, wherein the at least one computing device is further configured to create a log entry when the specific action prevents the software function from operating on the object, wherein the log entry includes one or more of:
- information regarding an identity of the detected software function;
- an identity of the object; and
- an identity of the rule.

16. A system for preventing a malicious or unwanted software action from being performed upon an object within a computer system, the system comprising:

at least one memory device upon which a plurality of pre-existing rules are stored, wherein each of the plurality of pre-existing rules is associated with a plurality of characteristics including a platform indicator that specifies a platform on which an object to which the rule applies operates, an object type indicator that specifies a type of object to which the rule applies, an object indicator that specifies a specific object to which the rule applies, and a function type indicator that specifies a function type that will be prevented from acting on the object; and at least one computing device configured to:

determine a rule from the plurality of pre-existing rules that applies to the object within the computer system, wherein determination of the rule that applies to the object includes a determination of a rule from the plurality of pre-existing rules that includes: a platform indicator that matches a platform on which the object operates, an object type indicator that matches an object type of the object, and an object indicator that matches the object associate object attributes with the object according to the rule, wherein the plurality of characteristics of the rule further include a list of one or more specific processes of the specified function type that will not be prevented from acting on the object, wherein the object attributes include a function type of the function type indicator, a classification that indicates that the functions of the function type indicator should be prevented from acting upon the object, and a list of the one or more specific processes, detect a software action attempting to act upon the object, determine whether the detected software function matches the function type of the object attributes, determine, when the detected software function matches the function type of the object attributes, whether the detected software function is one of the one or more specific processes, prevent the detected software function from acting on the object when the detected software function matches the function type of the object attributes and is not one of the one or more specific processes, and allow the detected software function to act on the object when the detected software function matches the function type of the object attributes and is one of the one or more specific processes.

17. The system of claim 16, wherein the one or more characteristics of the rule further includes an exception list that specifies one or more exceptions, wherein each exception is one of the plurality of preexisting rules, and wherein the detected software function is allowed to act upon the object when the detected function has a function type matching the one or more attributes and at least one of the one or more exceptions applies to the detected software function.

18. The method of claim 1, wherein associating object attributes with the object according to the rule further comprises associating one or more flags with the object.

19. The system of claim 11, wherein the at least one computing device configured to associate object attributes with the object according to the rule is further configured to associate one or more flags with the object.

* * * * *